United States Patent [19]

Reis et al.

[11] Patent Number: 4,961,911

[45] Date of Patent: Oct. 9, 1990

[54] PROCESS FOR REDUCING CARBON MONOXIDE EMISSIONS FROM A FLUIDIZED BED TITANIUM DIOXIDE CHLORINATOR

[75] Inventors: Paul G. Reis, Wilmington; Michael J. Dunbar, New Castle, both of Del.

[73] Assignee: E. I. Du Pont de Nemours and Company, Wilmington, Del.

[21] Appl. No.: 318,150

[22] Filed: Mar. 2, 1989

[51] Int. Cl.$^5$ .............................................. C01G 23/02
[52] U.S. Cl. ....................................... 423/72; 423/74; 423/78; 423/79; 423/246; 423/492
[58] Field of Search ................... 423/72, 74, 78, 79, 423/492, 246; 75/1 T, 2 T

[56] References Cited

U.S. PATENT DOCUMENTS

| | | | |
|---|---|---|---|
| 2,446,181 | 8/1948 | Kraus | 55/59 |
| 2,790,703 | 4/1957 | Frey | 423/74 |
| 2,802,721 | 8/1957 | Cooper | 423/79 |
| 2,815,091 | 12/1957 | Mas et al. | 55/69 |
| 2,974,009 | 3/1961 | Bashour et al. | 423/74 |
| 3,591,333 | 7/1971 | Carlson et al. | 423/74 |
| 3,596,438 | 8/1971 | Beukenkamp et al. | 55/59 |
| 3,628,913 | 12/1971 | Uhland | 423/77 |
| 3,883,636 | 5/1975 | Cole et al. | 423/74 |
| 3,906,077 | 9/1975 | Rado et al. | 423/74 |
| 4,519,988 | 5/1985 | Fridman | 423/74 |

*Primary Examiner*—Gary P. Straub
*Assistant Examiner*—Lori F. Cuomo

[57] ABSTRACT

A process for reducing the amount of carbon monoxide emitted from a fluidized bed reactor for chlorinating titanium bearing material containing iron oxide comprising (a) feeding coke, titanium bearing material containing iron oxide, and chlorine to the reactor, the chlorine being fed to the reactor below the surface of the fluidized bed, (b) maintaining the feed rate of the materials in step (a) and the conditions of operation of the bed so that the iron oxide is substantially converted to ferrous chloride, and (c) feeding sufficient chlorine to the reactor at or near the surface of the bed to convert the desired amount of carbon monoxide to carbon dioxide.

10 Claims, No Drawings

PROCESS FOR REDUCING CARBON MONOXIDE EMISSIONS FROM A FLUIDIZED BED TITANIUM DIOXIDE CHLORINATOR

BACKGROUND OF THE INVENTION

This invention relates to an improved method for reducing carbon monoxide emissions from a titanium dioxide fluidized bed chlorinator.

In such fluidized bed chlorinator, chlorine, coke, and titanium bearing material are fed to a fluidized bed under conditions which chlorinate the titanium and many other impurities. Gaseous titanium tetrachloride, other metallic chlorides such as iron chloride, carbon monoxide, carbon dioxide and other reaction products exit the fluidized bed reactor. The gaseous titanium tetrachloride produced can then be separated from the other metal chlorides and impurities and used to produce titanium dioxide pigment or titanium metal.

It would be desirable to have a simple method to reduce the amount of carbon monoxide emitted from the reactor because environmental requirements often restrict its release to a low level. While some means are known to reduce the amount of carbon monoxide emitted, they involve addition of compounds which can be undesirable in the titanium dioxide pigment or in the process to make such pigment.

The following information is disclosed which may be of interest to this invention.

U.S. Pat. No. 2,790,703 discloses a process for chlorinating titanium containing material by using carbon monoxide for the reducing agent. It is mentioned at column 1, lines 32-37, that the ratio of carbon monoxide to carbon dioxide produced depends upon reaction temperature and other reaction conditions. In Example 1, it is mentioned that the reaction products can be cooled by the addition of cold, liquid, titanium chloride.

U.S. Pat. No. 3,883,636 discloses a process for chlorinating titanium dioxide in a fluidized bed reactor. The efficiency of chlorination (as measured by the chlorine utilization or the carbon dioxide to carbon monoxide ratio of the gases produced) is improved by conducting the chlorination in the presence of compounds of chromium, lanthanum, or vanadium.

U.S. Pat. No. 3,591,333 also discloses a process for chlorinating titanium dioxide in a fluidized bed reactor. It is stated that the carbon dioxide to carbon monoxide ratio can be increased by the addition of compounds of magnesium, calcium, strontium, barium, cadmium and mixtures thereof.

SUMMARY OF THE INVENTION

In accordance with this invention there is provided:

A process for reducing the amount of carbon monoxide emitted from a fluidized bed reactor for chlorinating titanium bearing material containing iron oxide comprising:

(a) feeding coke, titanium bearing material containing iron oxide, and chlorine to the reactor, said chlorine being fed at or near the base of the reactor, (b) maintaining the feed rates in step (a) and the conditions of operation of the bed so that the iron oxide is substantially converted to ferrous chloride, and (c) feeding sufficient chlorine to the reactor at or near the surface of the bed to convert at least some carbon monoxide to carbon dioxide.

DETAILED DESCRIPTION OF THE INVENTION

The process for chlorinating titanium containing material in a fluidized bed reactor is known. Suitable processes are disclosed in the following U.S. Pat. Nos.: 2,701,179; 3,883,636; 3,591,333; and 2,446,181 which are hereby incorporated by reference.

In such process, particulate coke, particulate titanium-bearing material, chlorine and optionally oxygen or air are fed into a reaction chamber, and a suitable reaction temperature, pressure and flow rates are maintained to sustain the fluidized bed. Gaseous titanium tetrachloride and other metal chlorides are exhausted from the reactor chamber. The gaseous titanium tetrachloride so produced can then be separated from the other metal chlorides and used to produce titanium dioxide pigment or titanium metal.

Typical conditions and specifications for fluidized beds useful for this invention are as follows: reaction temperature of about 900°-1300° C., pressure of about 1.5-3 atmospheres, reactor size of about 6-25 feet in diameter with multiple chlorine jets in or near the base, reactor superficial velocity of about 0.5-1.5 feet per second, and a settled bed depth of about 6-25 feet. Typically, the titanium-containing material initially fed has a particle size of about 70-800 microns in diameter, and the coke initially fed has a particle size of about 300-3000 microns in diameter. Preferably, the chlorine jets will be located within 0-10, more preferably 0-8, and most preferably 0-5 feet of the base of the reactor. A most preferred location for the jets is in the base of the reactor.

The titanium bearing material can be any suitable titanium source material such as titanium containing ores including rutile, ilmenite or anatase ore; beneficiates thereof; titanium containing by-products or slags; and mixtures thereof. Ordinarily, the titanium bearing material contains iron oxide in the amount of about 0.5-50% percent, and preferably up to about 20 percent by weight.

The coke which is suitable for use in this invention is any carbonaceous material which has been subjected to a coking process. Preferred is coke or calcined coke which is derived from petroleum or coal or mixtures of such cokes.

In the process of this invention, the feed rates of the raw materials to the fluidized bed reactor, and the conditions of operation of the bed should be adjusted so that any iron chloride is substantially converted to ferrous chloride. (By substantially converted is meant that at least 50 percent, preferably at least 60 percent, and most preferably at least 70 percent, by weight, of the iron oxide in the titanium bearing material is converted to ferrous chloride.) The reason for this desired conversion is that to the extent iron oxide is allowed to react to the ferric state, additional quantities of chlorine will be required which will add additional cost to the process. Means for favoring the reaction to the ferrous state are well known, and most importantly involve not adding chlorine in substantial excess to that required to obtain the ferrous state.

The additional chlorine which is added in step (c) of the process should be introduced at or near the surface of the fluidized bed, i.e., in close enough proximity to the surface of the bed that it promotes the conversion of carbon monoxide to carbon dioxide. Preferably, the chlorine will be introduced within about 0-10 feet, preferably about 0–8 feet, and most preferably about 0–5 feet of the surface of the bed. Thus, preferably, the chlorine can be introduced at about the surface of the bed or above or below the surface of the bed, within about the foregoing ranges. An especially preferred embodiment is to add chlorine at about 0–10 feet above the surface of the bed.

The amount of chlorine added in step (c) is sufficient to cause the desired amount of carbon monoxide to convert to carbon dioxide. Preferably, the amount of chlorine used will be about 2–24, more preferably about 4–20, and most preferably about 5–15 pounds of chlorine per hour per square foot of the surface of the bed. Also, preferably, chlorine will be added until it no longer converts carbon monoxide to carbon dioxide or until the chlorine in the exit gas reaches a desired level. This can be done by analyzing the gases emitted from the reactor for the presence of carbon monoxide, carbon dioxide, and/or chlorine.

In order to optimize the benefits of this invention, preferably, the feed rates of the coke, titanium bearing material containing iron oxide, and chlorine in step (a) of this invention will be maintained at relatively constant rates. If this is done, then it generally will be easier to optimize the amount of chlorine added at or near the surface of the bed, and the amount of cooling necessary after step (c).

In a preferred embodiment of this invention, after step (c), the temperature of the bed is reduced to enhance reducing of the amount of carbon monoxide exiting the fluidized bed. A preferred method for reducing the temperature of the bed is to add liquid titanium tetrachloride above or below the surface of the bed. The titanium tetrachloride will cause cooling by volatilizing to its gaseous form and heating to the temperature of the product gases. In the less usual situation in which it is necessary to add heat to the bed in order to sustain the chlorination reaction, such as by adding air or oxygen to the chlorinating gas, the temperature of the bed may be lowered by reducing the amount of heat so added or by reducing the amount of heat so added and providing additional cooling. Because the net amount of heat generated by the reaction above that needed to maintain a desired reaction temperature can vary greatly depending on such factors as ore composition, temperatures of the feed materials, and amount of diluents, the amount by which the temperature is reduced can be about 5–300 degrees, preferably about 10–200 degrees, and most preferably about 15–150 degrees C.

The following examples illustrate this invention. Unless otherwise indicated, all percentages are by weight.

EXAMPLE 1

A fluidized bed reactor was operated at 950° C. It was fed with (a) an ore blend containing approximately 72 percent $TiO_2$, 22 percent iron oxides, and 6 percent other impurities, and (b) calcined petroleum coke. A chlorinating gas, consisting of approximately 70 per cent chlorine plus diluent gases consisting primarily of nitrogen, hydrogen chloride and oxides of carbon, was fed through multiple jets located at the base of the reactor. The feed rates of the ore, coke and chlorinating gas were, respectively, about 128, 29, and 235 pounds per hour per square foot of reactor cross-sectional area. Chlorine in the amount of about 2.4 pounds per hour per square foot of reactor cross-sectional area was fed about 5 feet above the surface of the static bed. The gases leaving the chlorinator were subjected to cooling, and the metal chlorides were condensed, leaving mostly non-condensible fixed gases. These fixed gases contained the following components in the following percentages by volume: carbon monoxide 8.4, carbon dioxide 46.5, and chlorine 0.069.

The amount of chlorine being fed above the bed was then increased to 12 pounds per hour per square foot of reactor cross-sectional area. After 1.75 hours the fixed gases leaving the chlorinator, after condensation and separation of the metal chlorides, were found to contain the following components in the following percentages by volume: carbon monoxide 6.8, carbon dioxide 47, and chlorine 0.12.

Thus, by increasing the chlorine feed above the bed from 2.4 to 12 pounds per hour per square foot of reactor cross-sectional area, the molar ratio of carbon monoxide to carbon dioxide was reduced from 0.181 to 0.145.

EXAMPLE 2

A fluidized bed reactor was operated at 1059° C. It was fed with (a) an ore blend containing approximately 72 per cent $TiO_2$, 22 per cent iron oxides and 6 per cent other impurities, and (b) coke. A fluidizing gas, consisting of approximately 70 per cent chlorine plus diluent gases consisting primarily of nitrogen, hydrogen chloride and oxides of carbon, was fed to a distributor at the bottom of the reactor. A stream of 11.1 pounds of chlorine per hour per square foot of reactor cross-sectional area entered the reactor about 5 feet above the level of the static bed. The gases leaving the chlorinator were subjected to cooling and the metal chlorides were condensed, leaving mostly non-condensible fixed gases. These fixed gases contained the following components in the following percentages by volume: carbon monoxide 7.3, carbon dioxide 47.5 and chlorine 0.062.

Crude liquid titanium tetrachloride was then fed to the reactor above the surface of the bed at a rate of 43.3 pounds per hour per square foot of reactor cross-sectional area to reduce the temperature of the reactor. After 5.4 hours, the temperature of the gases leaving the reactor was 1027 degrees C. The gases leaving the reactor were subjected to cooling and the metal chlorides were condensed, leaving mostly non-condensible fixed gases. These fixed gases contained the following components in the following percentages by volume: carbon monoxide 2.7, carbon dioxide 46 and chlorine 0.071. The molar ratio of carbon monoxide to carbon dioxide was reduced from 0.154 to 0.059.

EXAMPLE 3

A fluidized bed reactor was operated at a temperature of 964 degrees C. It was fed with an ore blend, containing approximately 74% $TiO_2$ and 21.5% iron oxides and 4.5% other impurities, and with coke. A fluidizing gas was fed to a distributor at the bottom of the reactor and consisted of about 75% chlorine plus diluent gas consisting primarily of nitrogen, hydrogen chloride, oxides of carbon and oxygen. The ore, coke and fluidizing gas were fed to the reactor at rates of 108, 18, and 227 pounds per hour per square foot of reactor cross-sectional area, respectively. A stream of 18 pounds of crude titanium tetrachloride per hour per square foot of reactor cross-sectional area was fed about 5 feet above the level of the static bed. The gases leaving the chlorinator contained the following components in the following percentages by volume: titanium tetrachloride 22.4%, iron chloride 6.9%, carbon dioxide 23.4, carbon monoxide 3.2%, nitrogen 36.3%, hydrogen chloride 7.3%, and chlorine 0.025%.

Chlorine in the amount of 14 pounds per hour per square foot of reactor cross-sectional area was then added to the reactor about 5 feet above the static bed level. After twenty minutes the gases leaving the chlorinator contained the following components in the following percentages by volume: titanium tetrachloride 23.8%, iron chlorides 6.6%, carbon dioxide 25.8%, carbon monoxide 1.5%, nitrogen 34.2%, hydrogen chloride 7.6%, and chlorine 0.025%. The molar ratio of carbon monoxide to carbon dioxide was reduced from 0.143 to 0.058. Over 90 per cent of the iron chloride was in the ferrous state.

The invention claimed is:

1. Process for reducing the amount of carbon monoxide emitted from a fluidized bed reactor for chlorinating titanium bearing material containing iron oxide comprising:
   (a) feeding coke, titanium bearing material containing iron oxide, and chlorine to the reactor, said chlorine being fed within about 0 to 10 feet of the base of the reactor,
   (b) maintaining the feed rates in step (a) and the conditions of operation of the bed so that the iron oxide is substantially converted to ferrous chloride, and
   (c) additionally feeding sufficient chlorine to the reactor within about 0 to 8 feet of the surface of the bed to convert at least some carbon monoxide to carbon dioxide.

2. The process of claim 1 wherein the amount of chlorine used in step (c) is about 2-25 pounds/hour/square foot of the surface of the bed.

3. The process of claim 1 wherein the amount of chlorine used in step (c) is about 4-20 pounds/hour/square foot of the surface of the bed.

4. The process of claim 1 wherein the amount of chlorine used in step (c) is about 5-15 pounds/hour/square foot of the surface of the bed.

5. The process of claim 1 wherein after the chlorine is added in step (c), the temperature of the bed is reduced to enhance the amount of carbon monoxide converted to carbon dioxide.

6. The process of claim 5 wherein the temperature is reduced by adding $TiCl_4$ above or below the surface of the bed.

7. The process of claim 5 wherein the temperature is reduced by about 5-300 degrees C.

8. The process of claim 1 wherein
   (i) the amount of chlorine used in step (c) is about 2-25 pounds/hour/square foot of the surface of the bed, and
   (ii) after the chlorine is added in step (c), the temperature of the bed is reduced to enhance the amount of carbon monoxide converted to carbon dioxide.

9. The process of claim 8 wherein in step (ii) the temperature is reduced by about 10-200 degrees C.

10. The process of any one of claims 1-9 wherein the feed rates of the coke, titanium bearing material containing iron oxide, and chlorine in step (a) are maintained relatively constant.

* * * * *